3,288,785
SALTS OF PHENOXY METHYL PENICILLIN AND
PROCESS OF MAKING SAME
Herbert Kuntscher, Kufstein, Tirol, and Oswald Sellemond, Tirol, Austria, assignors to Biochemie G.m.b.H., Kundl, Tirol, Austria, a corporation of Austria
No Drawing. Filed Jan. 6, 1964, Ser. No. 336,036
Claims priority, application Austria, Jan. 10, 1963,
208/63
13 Claims. (Cl. 260—239.1)

The present invention relates to pure, well crystallized, difficultly soluble salts of phenoxy methyl penicillin and more particularly to salts of phenoxy methyl penicillin with benzimidazole compounds, and to a process of making same.

Heretofore, considerable difficulties were encountered when producing crystalline penicillin salts with basically substituted benzimidazole compounds. It is, for instance, known that such basically substituted benzimidazole salts of penicillin G can be prepared only by using an extremely pure penicillin G component. Impure penicillin G does not yield the desired crystalline compound on reaction with the benzimidazole components. Therefore, attempts have been made to avoid these difficulties by selecting specific solvents and to precipitate the corresponding salts of penicillin G with basically substituted benzimidazole compounds in crystalline form from impure penicillin G solutions by using ketones as solvents.

However, this known method of producing basically substituted benzimidazole salts of penicillin G has proved to be unsatisfactory in the production of corresponding salts of phenoxy methyl penicillin, i.e. of penicillin V, when using the starting components in the form of their solutions and precipitating the resulting salt in the usual manner. Thereby, oily and not crystallizing or, respectively, amorphous products are obtained which cannot be used for the manufacture of pharmaceutical compositions to be administered parenterally.

It is one object of the present invention to overcome these difficulties of the prior art processes and to provide a process which permits the preparation of a well crystallizing, difficulty soluble salt of phenoxy methyl penicillin and basically substituted benzimidazole compounds.

Another object of the present invention is to provide such new and valuable very pure, well crystallizing difficultly soluble salts of phenoxy methyl penicillin with basically substituted benzimidazole compounds which are especially suitable for parenteral administration.

A further object of the present invention is to provide parenterally administrable compositions containing salts of phenoxy methyl penicillin with basically substituted benzimidazole compounds suspended in an aqueous medium so at to be ready for administration which compositions are highly stable and can be stored for more than one year without any loss of activity.

Still another object of the present invention is to provide a process of administering such new and valuable, well crystallized salts of phenoxy methyl penicillin with basically substituted benzimidazole compounds in combating infectious diseases in humans and animals.

Other objects of the present invention and advantageous features thereof will become apparent as the description proceeds.

The new well crystallized, difficultly soluble salts of phenoxy methyl penicillin and basically substituted benzimidazole compounds are salts with benzimidazole compounds of the following formula

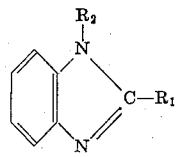

wherein $R_1$ is an aliphatic hydrocarbon residue containing at least one secondary or tertiary amino group while
$R_2$ is an aralkyl hydrocarbon residue which may be substituted, for instance, by halogen, lower alkoxy or lower alkyl.

Salts of phenoxy methyl penicillin and the basically substituted benzimidazole compounds of the above given formula are of special importance due to their advantageous properties. They produce a high penicillin blood level over a prolonged period of time and exhibit a high antihistaminic activity due to their benzimidazole component. Salts of this type are usually administered parenterally in the form of suspensions. However, to produce parenterally administrable suspensions, requires small but well-formed crystals of the active agent to be suspended in order to improve the injectability of the respective composition. The oily and not crystallizing or, respectively, amorphous products obtained heretofore are unsuitable for producing such injectable compositions.

According to the present invention it was found that extremely pure, well crystallizing, and well injectable, difficultly soluble salts of phenoxy methyl penicillin with the above mentioned basically substituted benzimidazole compounds can be obtained by (a) Using the phenoxy methyl penicillin in the form of its free acid or its metal salt and (b) Reacting said penicillin component with the benzimidazole base of the above given formula or with a salt of such a base in such a manner, that (c) Both reaction components, the penicillin component as well as the benzimidazole component, are suspended in a suspending agent in which the penicillin component is difficultly soluble while the benzimidazole component is well soluble, (d) Heating the mixture to a temperature not substantially exceeding 60° C., (e) Adding to the resulting solution between about 5% and about 10% of seed crystals of the desired salt, said amount being calculated for the amount of the desired final product, (f) Said seed crystals having a particle size between about 5µ and about 20µ, and (g) Slowly cooling the solution, preferably with the addition of water which is added in portions from time to time.

By using the phenoxy methyl penicillin in the form of the free acid or its metal salts as well as by using a suspending agent in which the penicillin component is difficultly soluble and the benzimidazole component is readily soluble, it is possible to slow down and retard salt formation so that crystals of substantially the same uniform size are produced. Thereby, it is not necessary that the resulting crystals have a particle size which renders them directly suitable for the preparation of parenteral suspensions. It is only necessary that crystals with a ratio of width to length of each crystal not exceeding a ratio of 1:3 are obtained. Furthermore, the particle size of said crystals is as uniform as possible, i.e., excessively large or small crystals are absent. When proceeding according to the process of this invention, crystals are obtained which have, as an average, a particle size between about 30μ and about 60μ. By subsequent comminution of said crystals, for instance, by means of a micronizer or a jet mill, an average particle size between about 5μ and about 20μ may be obtained. It is necessary that no particles of the comminuted crystals have a particle size exceeding about 50μ in order to eliminate any danger of clogging of the injection needle.

When using in the process according to this invention phenoxy methyl penicillinic acid or the calcium salt of said acid as penicillin component, preferably a mixture of water and alcohol is used as suspending agent. The preferred procedure thereby is to suspend the penicillin component in water and to dissolve the benzimidazole component in ethanol and then to mix said suspension and solution while heating. When using, as metal salt of phenoxy methyl penicillin, a water soluble salt, such as the potassium salt, preferably a higher alcohol especially butanol is used as suspending agent. Both reaction components are combined with the suspending agent and the mixture is heated.

In order to achieve optimum suspension and easy aspiration by the injection syringe, it is of advantage to add during the last reaction steps and especially the addition of the agent promoting complete precipitation of the salt, such as water, a small amount of a dispersing aid such as cholesterol, lecithin, polyoxyethylene sorbitan monolaurate, polysorbate, and other non-ionic surface active agents sold under the trademarks "Span" and "Tween," or the like compounds. For instance, 0.5 g. of polysorbate 80 sold under the trademark "Tween 80" is added to 1 l. of water. Such suspending and dispersing aids envelop and cover the crystals and improve their suspension even after comminution. To further improve the suspendibility of the crystals, the precipitated salt may be treated, before it is comminuted, with 0.5% to 3% of the above mentioned dispersing aids which are admixed thereto. The thus treated crystals are then ground and sieved.

A prerequisite for successfully carrying out the process according to the present invention is the use of a specific penicillin component which is difficulty soluble in the reaction medium as starting material, of a suitable suspending agent in which the penicillin component is difficultly soluble while the benzimidazole component is readily soluble, and the use of seed crystals of the desired salt in a specific amount and of a specific predetermined crystal size.

The process according to the present invention permits not only the use of a purified penicillin component but also of impure penicillin and its salts as they are obtained directly on fermentation which still contain the impurities produced by such biological manufacturing processes. To obtain the desired uniform crystals, it is of considerable importance that specific temperatures and a specific rate of cooling are maintained. Thus it is necessary to maintain a temperature between 40° C. and 50° C., after mixing the penicillin suspension and the benzimidazole solution. Thereafter, the mixture is cooled slowly while stirring whereby the temperature must not decrease more than 5° C. within every 30 minutes. To complete precipitation of the resulting salt, the concentration of the dissolved penicillin portion may be reduced by the addition of a substance which causes decrease in solubility of the salt formed, such as water, when a certain predetermined temperature is attained. Preferably such an addition is made in three portions when starting with starting charges of about 0.1 kg. Thereby, uniform crystals are obtained.

According to a preferred procedure, the first one third of the additive causing decrease in solubility of the resulting salt is very slowly added while stirring as soon as a temperature of about 30° C. is reached. The second one third of said additive is admixed as soon as the temperature has decreased to about 25° C. and the last one third is added when a temperature of about 20° C. is obtained.

The salts obtained according to the process of this invention are especially valuable for therapeutical purposes. As stated hereinabove, for instance, the pure, well crystallizing salt of phenoxy methyl penicillin with 1-p-chlorobenzyl-2-pyrrolidyl-N-methyl benzimidazole does not settle in its suspension ready for administration within a considerably prolonged period of time. Furthermore, it is very stable in aqueous suspension. No decrease in activity could be observed after storing suspensions containing such a salt for more than one year.

The following examples serve to illustrate the present invention without, however, limiting the same thereto.

*Example 1*

53 g. of phenoxy methyl penicillinic acid are suspended in 50 cc. of water at room temperature. A solution of 67.5 g. of 1-p-chlorobenzyl-2-(pyrrolidyl-N-methyl) benzimidazole acetate in a mixture of 60 cc. of water and 80 cc. of ethanol which has been heated to 65° C. is added to said suspension while stirring continuously. After addition of the solution of the benzimidazole compound, the temperature of the reaction mixture is between 45° C. and 50° C. Five minutes after mixing the suspension and the solution, 2.97% of phenoxy methyl penicillinic acid are present in dissolved form while 97.3% are present as solid phase at the bottom of the mixture. The reaction mixture is then slowly cooled while stirring whereby care is taken that the temperature does not decreased by more than 5° C. every thirty minutes. As soon as a temperature of about 40° C. has been attained, 10 g. of seed crystals of the resulting salt are slowly added. Thereafter, slow cooling proceeds at about the same rate. At a temperature of about 30° C., 130 cc. of water are slowly admixed while stirring continuously. The same amount of water is added as soon as a temperature of 25° C. is attained, and likewise at a temperature of about 20° C. Precipitation is then completed. The precipitated salt is filtered off by suction, washed with dilute ethanol, and dried in a vacuum at 40° C. The 1-p-chlorobenzyl-2-pyrrolidyl-N-methyl benzimidazole salt of phenoxy methyl penicillin, having an activity of about 880 I.U./mg. is obtained in a yield of about 85% in the form of regular crystals of a particle size of about 30μ and about 60μ.

*Example 2*

60 g. of calcium phenoxy methyl penicillin are suspended in 50 cc. of water. A a solution of 63 g. of 1-p-chlorobenzyl-2-pyrrolidyl-N-methyl benzimidazole hydrochloride in a mixture of 60 cc. of water and 80 cc. of ethanol which was heated to about 65° C. is added to said suspension. After addition of said solution, the temperature of the mixture is between about 45° C. and 50° C. Care is taken that the pH-value of the suspension is about 4.4. If required, it must be adjusted to said pH-value by the addition of hydrochloric acid. Five minutes after mixing these two reaction components 6.35% of the calcium phenoxy methyl penicillin are present in dissolved form while 93.65% of said calcium salt are present as solid phase at the bottom of the reaction mixture. The mixture is slowly cooled while stirring whereby care is taken that the temperature does not decrease more than 5° C. every 30 minutes. As soon as a temperature of 40° C. is attained, 5 g. of seed crystals of the salt are slowly added and cooling of the mixture is continued at the same rate. As soon as a temperature of 30° C. is attained, 130 cc. of water are slowly added thereto while stirring continuously. The same amount of water is added as soon as a temperature of 25° C. is attained and again, as soon as the temperature has decreased to about 20° C. Thereafter, precipitation is completed. The resulting salt is filtered off by suction, washed with dilute ethanol, and dried in a vacuum at 40° C. The 1-p-chlorobenzyl - 2 - pyrrolidyl - N - methyl benzimidazole salt of phenoxy methyl penicillin having an activity of about 880 I.U./mg. is obtained in a yield of about 85%. The particle size of the crystals is between 30µ and 60µ.

*Example 3*

30 g. of potassium phenoxy methyl penicillin and 31 g. of 1-p-chlorobenzyl-2-pyrrolidyl-N-methyl benzimidazole hydrochloride are suspended in 150 cc. of butanol. The suspension is heated to about 50° C. and 4 cc. of water are added thereto in order to decrease the solubility of the 1-p-chlorobenzyl-2-pyrrolidyl-N-methyl benzimidazole salt of phenoxy methyl pencillin in butanol. Five minutes after a temperature of 50° C. has been attained, 1.15% of potassium phenoxy methyl penicillin are present in dissolved form while the remainder of the penicillin salt is present as solid phase at the bottom of the reaction mixture. The mixture is slowly cooled whereby care is taken that the temperature does not decrease more than 5° C. every 30 minutes. As soon as a temperature of 40° C. is attained, 3 g. of seed crystals of the salt of a particle size between 5µ and 20µ are added. Cooling of the mixture is continued at the same rate to a temperature of 20° C., whereby 35 cc. of water are added in small portions during cooling in order to further decrease the solubility of the 1-p-chlorobenzyl-2-pyrrolidyl-N-methyl benzimidazole salt of phenoxy methyl penicillin in butanol. The reaction mixture is then further cooled to a temperature of about 5° C. whereafter 20 cc. of water are added. The mixture is allowed to stand at 5° C. for one hour. The resulting salt is filtered off by suction, washed with dilute ethanol, and dried in a vacuum at 40° C. The 1-p-chlorobenzyl-2-pyrrolidyl - N - methyl benzimidazole salt of phenoxy methyl penicillin, having an activity of about 880 I.U./mg. is obtained in a yield of about 70%. The resulting crystals have a particle size within the range of 30µ and 60µ. The not precipitated penicillin remaining in the filtrate can be extracted by means of potassium phosphate buffer solution of a pH of 7.8 and is almost quantitatively recovered as phenoxy methyl penicillinic acid by acidifying the extract with hydrochloric acid to a pH of 1.8.

Although 1 - p - chlorobenzyl - 2 - pyrrolidyl-N-methyl benzimidazole and its hydrochloride have proved to be the most preferred basically substituted benzimidazole compounds, other benzimidazole compounds of the above given formula may also be used such as 1-benzyl-2-dimethylaminoethyl benzimidazole,
1-benzyl-2-piperidyl-N-isopropyl benzimidazole,
1-p-methyl benzyl-2-methylaminoethyl benzimidazole,
1-phenyl ethyl-2-morpholino-N-methyl benzimidazole,
1-p-bromobenzyl-2-pyrrolidyl-N-methyl benzimidazole,
1-p-chlorobenzyl-2-piperidino-N-methyl benzimidazole,
1-p-bromobenzyl-2-piperidino-N-methyl benzimidazole,
1-p-methoxy benzyl-2-pyrrolidyl-N-methyl benzimidazole,
1-p-methyl benzyl-2-pyrrolidyl-N-methyl benzimidazole,
1-p-chlorobenzyl-2-dimethylamino methyl benzimidazole,
1-p-chlorobenzyl-2-diethylamino methyl benzimidazole,
1-benzyl-2-butylamino methyl benzimidazole.

In place of the benzimidazole base there may be employed other acid addition salts such as hydrochloride, hydrobromide, acetate, sulfate, phosphate, succinate, tartrate, benzoate, nicotinate and others.

In place of the calcium and potassium salts of phenoxy methyl penicillin there may be employed the sodium salt, or other salts difficulty soluble in the suspending liquid as used, e.g. the aluminum salt.

*Example 4*

40 g. of sodium phenoxy methyl penicillin and 43.2 g. of 1-p-chlorobenzyl-2-pyrrolidyl-N-methyl benzimidazole hydrochloride are suspended in 210 cc. of butanol. The mixture was then heated to 50° C. and 5.5 ml. water were added to reduce the solubility of the 1-p-chloro benzyl-2-pyrrolidyl-N-methyl benzimidazole salt of phenoxy methyl penicillin in butanol. Five minutes after a temperature of 50° C. has been attained 2.30% of the sodium phenoxy methyl penicillin are present in dissolved form while the remainder of said sodium salt is present as solid phase at the bottom of the reaction mixture. The mixture is slowly cooled whereby care is taken that the temperature does not decrease more than 5° C. every 30 minutes. As soon as a temperature of 40° C. is attained, 5 g. of seed crystals of the salt having a particle size between 5µ and 20µ are added and cooling of the mixture is continued at the same rate, until a temperature of 20° C. is atained; during this cooling 50 cc. of water are added in small portions to further decrease the solubility of the 1-p-chlorobenzyl-2-pyrrolidyl-N-methyl benzimidazole salt of phenoxy methyl penicillin in butanol. The reaction mixture is then further cooled to a temperature of about 5° C. whereafter 30 cc. of water are added. The mixture is allowed to stand at 5° C. for one hour. The resulting salt is filtered off by suction, washed with dilute ethanol, and dried in a vacuum at 40° C. The 1 - p - chlorobenzyl-2-pyrrolidyl-N-methyl benzimidazole salt of phenoxy methyl penicillin having an activity of about 880 I.U./mg. is obtained in a yield of 70%. The particle size of the crystals is between 30µ and 60µ. The not precipitated penicillin remaining in the filtrate can be extrated by means of potassium phosphate buffer solution of a pH of 7.8 and is almost quantitatively recovered as phenoxy methyl penicillinic acid by acidifying the extract with hydrochloric acid to a pH of 1.8.

*Example 5*

80 g. of phenoxy methyl penicillinic acid are suspended in 76 cc. of water at room temperature. A solution of 113 g. of 1-p-bromobenzyl-2-pyrrolidyl-N-methyl benzimidazole acetate in a mixture of 91 cc. of water and 121 cc. of methanol which was heated to about 65 ° C. is added to said suspension. After addition of said solution, the temperature of the mixture is between about 45° C. and 50° C. 5 minutes after mixing these two reaction components 2.55% of the phenoxy methyl penicillinic acid are present in dissolved form while 97.45% of said penicillinic acid are present as solid phase at the bottom of the reaction mixture. The mixture is slowly cooled while stirring whereby care is taken that the temperature does not decrease more than 5° C. every 30 minutes. As soon as a temperature of 40° C. is attained, 10 g. of seed crystals of the salt are slowly added and cooling of the mixture is continued at the same rate. As soon as a temperature of 30° C. is attained, 190 cc. of water are slowly added thereto while stirring continuously. The same amount of water is added as soon as a temperature of 25° C. is attained and again, as soon as the temperature has decreased to about 20° C. Thereafter, precipitation is completed. The resulting salt is filtered off by suction, washed with dilute methanol, and dried in a vacuum at 40° C. The 1-p-bromobenzyl-2-pyrrolidyl-N-methyl benzimidazole salt of phenoxy methyl penicillin having an activity of about 860 I.U./mg. is obtained in a yield of about 82% in the form of regular crystals. The particle size of the crystals is between 30µ and 60µ.

*Example 6*

30 g. of potassium phenoxy methyl penicillin and 32.2 g. of 1-p-chlorobenzyl-2-piperidino-N-methyl benzimidazole hydrochloride are suspended in 150 ml. butantanol. The mixture was heated to 50° C. and 4 ml.

water are then added to reduce the solubility of the 1-p-chlorobenzyl-2-piperidino-N-methyl benzimidazole salt of phenoxy methyl penicillin in butanol. Five minutes after a temperature of 50° C. has been attained, 1.15% of the potassium phenoxy methyl penicillin are present in dissolved form while the remainder of said potassium salt is present as solid phase at the bottom of the reaction mixture. The mixture is slowly cooled whereby care is taken that the temperature does not decrease more than 5° C., every 30 minutes. As soon as a temperature of 40° C. is attained, 6 g. of seed crystals of the salt having a particle size between $5\mu$ and $20\mu$ are added and cooling of the mixture is continued at the same rate. As soon as a temperature of 20° C. is attained, 35 cc. of water are slowly added thereto in small portions to further decrease the solubility of the 1-p-chlorobenzyl-2-piperidino-N-methyl benzimidazole salt of phenoxy methyl penicillin in butanol. The reaction mixture is then further cooled to a temperature of 5° C., whereafter 20 cc. of water are added. The mixture is allowed to stand at 5° C. for one hour. The resulting salt is filtered off by suction, washed with dilute ethanol, and dried in a vacuum at 40° C. The 1-p-chlorobenzyl-2-piperidino-N-methyl benzimidazole salt of phenoxy methyl penicillin having an activity of about 860 I.U./mg. is obtained in a yield of 75%. The particle size of the crystals is between $30\mu$ and $60\mu$.

*Example 7*

60 g. of calcium phenoxy methyl penicillin are suspended in 50 cc. of water. A solution of 65.5 g. of 1-p-chlorobenzyl-2-piperidino-N-methyl benzimidazole hydrochloride in a mixture of 60 cc. of water and 80 cc. of ethanol which was heated to about 65° C. is added to said suspension. After addition of said solution, the temperature of the mixture is between about 45° C. and 50° C. Care is taken that the pH-value of the suspension is about 4.4. Five minutes after mixing these two reaction components 6.35% of the calcium phenoxy methyl penicillin are present in dissolved form while the remainder of said calcium salt is present as solid phase at the bottom of the reaction mixture. The mixture is slowly cooled while stirring whereby care is taken that the temperature does not decrease more than 5° C. every 30 minutes. As soon as a temperature of 40° C. is attained, 5 g. of seed crystals of the salt are slowly added and cooling of the mixture is continued at the same rate. As soon as a temperature of 30° C. is attained, 130 cc. of water are slowly added thereto while stirring continuously. The same amount of water is added as soon as a temperature of 25° C. is attained and again, as soon as the temperature has decreased to about 20° C. Thereafter, precipitation is completed. The resulting salt is filtered off by suction, washed with dilute ethanol, and dried in a vacuum at 40° C. The 1-p-chlorobenzyl-2-piperidino-N-methyl benzimidazole salt of phenoxy methyl penicillin having an activity of about 860 I.U./mg. is obtained in a yield of 85%. The particle size of the crystals is between $30\mu$ and $60\mu$.

*Example 8*

53 g. of phenoxy methyl penicillinic acid are suspended in 50 cc. of water at room temperature. A solution of 66.5 g. of 1-p-methoxy benzyl-2-pyrrolidyl-N-methyl benzimidazole acetate in a mixture of 60 cc. of water and 80 cc. of ethanol which was heated to 65° C. is added to said suspension while stirring continuously. After addition of said solution, the temperature of the mixture is between about 45° C. and 50° C. Five minutes after mixing these two reaction components, 2.97% of the phenoxy methyl penicillinic acid are present in dissolved form while 97.03% of said penicillinic acid are present as solid phase at the bottom of the reaction mixture. The mixture is slowly cooled while stirring whereby care is taken that the temperature does not decrease more than 5° C., every 30 minutes. As soon as a temperature of 40° C. is attained, 10 g. of seed crystals of the salt are slowly added and cooling of the mixture is continued at the same rate. As soon as a temperature of 30° C. is attained, 130 cc. of water are added thereto while stirring continuously. The same amount of water is added as soon as a temperature of 25° C. is attained and again, as soon as the temperature has decreased to about 20° C. Thereafter, precipitation is completed. The resulting salt is filtered off by suction, washed with dilute ethanol, and dried in a vacuum at 40° C. The 1-p-methoxy benzyl-2-pyrrolidyl-N-methyl benzimidazole salt of phenoxy methyl penicillin having an activity of about 880 I.U./mg. is obtained in a yield of 80%. The particle size of the crystals is between $20\mu$ and $50\mu$

*Example 9*

60 g. of potassium phenoxy methyl penicillin and 58.7 g. of 1-p-methyl benzyl-2-pyrrolidyl-N-methyl benzimidazole hydrochloride are suspended in 300 cc. of butanol. The mixture is heated to about 50° C. and about 8 ml. of water are there added to said suspension to reduce the solubility of the 1-p-methyl benzyl-2-pyrrolidyl-N-methyl benzimidazole salt of phenoxy methyl penicillin in butanol. Five minutes after a temperature of 50° C. has been attained 1.15% of the potassium phenoxy methyl penicillin are present in dissolved form while the remainder of said potassium salt is present as solid phase at the bottom of the reaction mixture. The mixture is slowly cooled whereby care is taken that the temperature does not decrease more than 5° C. every 30 minutes. As soon as a temperature of 40° C. is attained, 6 g. of seed crystals of the salt are added and cooling of the mixture is continued at the same rate until a temperature of 20° C. is attained whereby 70 cc. of water are added thereto in small portions to further decrease the solubility of the 1-p-methyl benzyl-2-pyrrolidyl-N-methyl benzimidazole salt of phenoxy methyl penicillin. The reaction mixture is then further cooled to a temperature of about 20° C. whereafter 40 cc. of water are added. The mixture is allowed to stand at 5° C. for one hour. The resulting salt is filtered off by suction, washed with dilute ethanol, and dried in a vacuum at 40° C. The 1-p-methyl benzyl-2-pyrrolidyl-N-methyl benzimidazole salt of phenoxy methyl penicillin having an activity of about 850 I.U./mg. is obtained in a yield of 72%. The particle size of the crystals is between $20\mu$ and $60\mu$.

*Example 10*

40 g. of sodium phenoxy methyl penicillin and 40.1 g. of 1-p-chlorobenzyl-2-dimethylamino methyl benzimidazole hydrochloride are suspended in 210 ml. butanol. The mixture was heated to about 50° C. and 5.5 ml. water are then added to said suspension to reduce the solubility of the 1-p-chlorobenzyl-2-dimethylaminomethyl benzimidazole salt of phenoxy methyl penicillin in butanol. Five minutes after a temperature of 50° C. has been attained, 2.3% of the sodium phenoxy methyl penicillin are present in dissolved form while the remainder of said sodium salt is present as solid phase at the bottom of the reaction mixture. The mixture is slowly cooled whereby care is taken that the temperature does not decrease more than 5° C. every 30 minutes. As soon as a temperature of 40° C. is attained, 5 g. of seed crystals of the salt are added and cooling of the mixture is continued at the same rate until a temperature of 20° C. is attained, whereby 70 cc. of water are added thereto in small portions to further decrease the solubility of the 1-p-chlorobenzyl-2-dimethylaminomethyl benzimidazole salt of phenoxy methyl penicillin. The reaction mixture is then further cooled to a temperature of about 5° C. whereafter 40 cc. of water are added. The mixture is allowed to stand at 5° C. for one hour. The resulting salt is filtered off by suction, washed with dilute ethanol, and dried in a vacuum at 40° C. The 1-p-chlorobenzyl-2-dimethylaminomethyl benzimidazole salt of phenoxy methyl penicillin having an activity of about 900 I.U./mg. is obtained in a yield of 70%. The particle size of the crystals is between 30μ and 70μ.

*Example 11*

80 g. of phenoxy methyl penicillinic acid are suspended in 76 cc. of water at room temperature. A solution of 102 g. of 1-p-chlorobenzyl-2-diethylaminomethyl benzimidazole acetate in a mixture of 91 cc. of water and 121 cc. of ethanol which was heated to about 65° C. is added to said suspension. After addition of said solution, the temperature of the mixture is between about 45° C. and 50° C. Five minutes after mixing these two reaction components 2.97% of the phenoxy methyl penicillinic acid are present as solid phase at the bottom of the reaction mixture. The mixture is slowly cooled while stirring whereby care is taken that the temperature does not decrease more than 5° C. every 30 minutes. As soon as a temperature of 40° C. is attained, 10 g. of seed crystals of the salt are slowly added and cooling of the mixture is continued at the same rate until a temperature of 30° C. is attained, 190 cc. of water are slowly added thereto while stirring continuously. The same amount of water is added as soon as a temperature of 25° C. is attained and again, as soon as the temperature has decreased to about 20° C. Thereafter, precipitation is completed. The resulting salt is filtered off by suction, washed with dilute methanol, and dried in a vacuum at 40° C. The 1-p-chlorobenzyl-2-diethylaminomethyl benzimidazole salt of phenoxy methyl penicillin having an activity of about 880 I.U./mg. is obtained in a yield of 80%. The particle size of the crystals is between 30μ and 60μ.

*Example 12*

40 g. of sodium phenoxy methyl penicillin and 39.4 g. of 1-benzyl-2-butylaminomethyl benzimidazole hydrochloride, are suspended in 210 ml. butanol. The mixture was heated to 50° C. and 4 ml. of water are then added to said suspension to reduce the solubility of the 1-benzyl-2-butylaminomethyl benzimidazole salt of phenoxy methyl penicillin in butanol. Five minutes after a temperature of 50° C. has been attained, 2.3% of the sodium phenoxy methyl penicillin are present in dissolved form while the remainder of said sodium salt is present as solid phase at the bottom of the reaction mixture. The mixture is slowly cooled whereby care is taken that the temperature does not decrease more than 5° C. every 30 minutes. As soon as a temperature of 40° C. is attained, 10 g. of seed crystals of the salt are added; cooling of the mixture is continued at the same rate until a temperature of 20° C. is attained; during said cooling 40 cc. of water are added thereto in small portions to further decrease the solubility of the 1-benzyl-2-butylaminomethyl benzimidazole salt of phenoxy methyl penicillin in butanol. The reaction mixture is then further cooled to a temperature of about 5° C. whereafter 30 cc. of water are added. The mixture is allowed to stand at 5° C. for one hour. The resulting salt is filtered off by suction, washed with dilute ethanol, and dried in a vacuum at 40° C. The 1-benzyl-2-butylaminomethyl benzimidazole salt of phenoxy methyl penicillin having an activity of about 880 I.U./mg. is obtained in a yield of 72%. The particle size of the crystals is between 10μ and 50μ.

*Example 13*

The crystals of the salt of phenoxy methyl penicillin with 1-p-chlorobenzyl-2-pyrrolidyl-N-methyl benzimidazole obtained according to Examples 1 to 4 are ground in a micronizer to a particle size between about 5μ and about 20μ and are then suspended in water with the addition of 2% of polysorbate 80. The resulting suspension is stable for more than 12 months when kept at room temperature. There is only a very slight decrease in activity from 880 I.U./mg. to about 860 I.U./mg. within said period of storage.

*Example 14*

The procedure is the same as described in Example 1. However, the water added in three portions during cooling of the reaction mixture contains about 0.5 g. of polysorbate 80 per 1 liter of water. The resulting precipitated salt can readily be suspended after grinding.

While the basically substituted benzimidazole compounds which can generally be used for the purpose of the present invention correspond to the formula given in column 2, the preferred compounds may be represented by the following formula

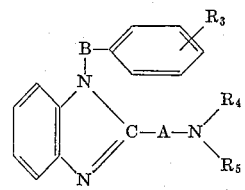

wherein $R_3$ indicates hydrogen, halogen, especially chlorine and bromine, lower alkoxy or lower alkyl,
A indicates alkylene with one to three carbon atoms,
B indicates lower alkylene with one to three carbon atoms,
$R_4$ indicates hydrogen or lower alkyl,
$R_5$ indicates lower alkyl, and
$R_4$ and $R_5$, together with the nitrogen atom to which they are attached, forming a piperidine, morpholine, pyrrolidine, or piperazine ring.

Of course, many changes and variations in the starting components, the solvents, and suspending agents used, the reaction conditions, temperature, duration, the particle size of the seed crystals, the amounts of water added to precipitate the new salt, the methods of working up the resulting salt, and the like may be made by those skilled in the art in accordance with the principles set forth herein and in the claims annexed hereto.

We claim:

1. In a process of producing substantially pure, well crystallizing, difficultly soluble salts of phenoxy methyl penicillin, the steps which comprise reacting a phenoxy methyl penicillin compound selected from the group consisting of phenoxy methyl penicillinic acid and its metal salts with a benzimidazole compound selected from the group consisting of a basically substituted benzimidazole compound of the following formula

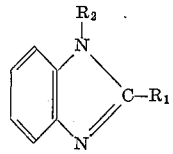

wherein $R_1$ is a member selected from the group consisting of an aliphatic hydrocarbon radical containing a secondary amino group and an aliphatic hydrocarbon radical containing a tertiary amino group, while
$R_2$ is a member selected from the group consisting of aralkyl and substituted aralkyl, and its acid addition salts in a suspending liquid wherein the phenoxy methyl penicillin compound is difficultly soluble and the basically substituted benzimidazole compound is readily soluble at a temperature not substantially exceeding 60° C., adding to the resulting mixture seed crystals of the salt of said phenoxy methyl penicillin with said basically substituted benzimidazole compound in an amount between about 5% and about 10% calculated for the amount of the desired final salt, said seed crystals having a particle size between about 5μ and about 20μ, and slowly cooling the seeded reaction mixture.

2. The process according to claim 1, wherein the temperature on mixing the penicillin compound and the basically substituted benzimidazole compound, is between about 40° C. and about 50° C.

3. The process according to claim 1, wherein water is added portion by portion during cooling of the reaction mixture.

4. The process according to claim 1, wherein cooling is effected in such a manner that the temperature decrease during cooling does not exceed about 5° C. every 30 minutes.

5. The process according to claim 1, wherein cooling is effected while stirring.

6. The process according to claim 1, wherein a cold suspension of the phenoxy methyl penicillin compound is mixed with a solution of the basically substituted benzimidazole compound which has been heated to such a temperature that, after mixing, a temperature between about 40° C. and about 50° C. is attained.

7. The process according to claim 1, wherein a small amount of a dispersing aid is added during cooling.

8. In a process of producing the pure, well crystallizing, difficultly soluble salt of phenoxy methyl penicillin and 1 - p - chlorobenzyl - 2 - pyrrolidyl - N - methyl benzimidazole, the steps which comprise suspending phenoxy methyl penicillinic acid in water at room temperature, adding said suspension to a solution of equimolecular amounts of 1-p-chlorobenzyl-2-pyrrolidyl-N-methyl benzimidazole acetate in a mixture of water and ethanol, said solution being heated to 65° C. while stirring, slowly cooling the resulting solution with stirring at a cooling rate not exceeding a temperature decrease of 5° C. every 30 minutes, adding about 10% of seed crystals of the salt of phenoxy methyl penicillin with 1-p-chlorobenzyl-2-pyrrolidyl-N-methyl benzimidazole as soon as a temperature of 40° C. has been attained, continuing cooling at said rate, adding slowly water to said reaction mixture in portions as soon as a temperature of 30° C., 25° C., and 20° C. has been attained, and removing the resulting salt of phenoxy methyl penicillin and 1-p-chlorobenzyl-2-pyrrolidyl-N-methyl benzimidazole from the reaction mixture.

9. The process according to claim 8, wherein calcium phenoxy methyl penicillin is used as phenoxy methyl penicillin compound and is reacted with the equimolecular amount of the hydrochloride of 1-p-chlorobenzyl-2-pyrmolecular amount of 1-p-chlorobenzyl-2-pyrrolidyl-N-

10. In a process of producing the salt of phenoxy methyl penicillin with 1-p-chlorobenzyl-2-pyrrolidyl-N-methyl benzimidazole, the steps which comprise suspending potassium phenoxy methyl penicillin and the equimolecular amount of 1-p-chlorobenzyl-2-pyrrolidyl-n-methyl benzimidazole hydrochloride in butanol, heating said suspension to about 50° C., slowly cooling the butanol suspension at a rate not exceeding 5° C. every 30 minutes, adding 5% of seed crystals of said salt having a particle size between about $5\mu$ and about $20\mu$ to said suspension as soon as a temperature of 40° C. has been attained, cooling the resulting mixture at the same rate with the addition of small portions of water during cooling to about 20° C., continuing cooling to about 5° C. with the addition of further amounts of water, and removing the resulting salt of phenoxy methyl penicillin with 1-p-chlorobenzyl-2-pyrrolidyl-N-methyl benzimidazole from the reaction mixture.

11. The stable aqueous suspension, of crystals of the salt of phenoxy methyl penicillin with 1-p-chlorobenzyl-2-pyrrolidyl-N-methyl benzimidazole, said crystals having a particle size between about 5 microns and about 20 microns, the ratio between breadth and length of said salt crystals not exceeding a ratio of 1:3.

12. The stable aqueous suspension according to claim 11, wherein a dispersing aid is added to the suspension.

13. The stable aqueous suspension of crystals of the salt of phenoxy methyl penicillin with a benzimidazole of the formula

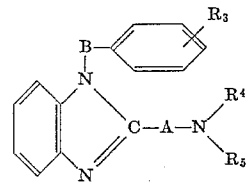

wherein $R_3$ indicates a member selected from the group consisting of hydrogen, halogen, lower alkoxy, and lower alkyl;

A indicates alkylene with one to three carbon atoms;

B indicates alkylene with one to three carbon atoms;

$R_4$ indicates a member selected from the group consisting of hydrogen and lower alkyl;

$R_5$ indicates a member selected from the group consisting of lower alkyl and, together with $R_4$ and the nitrogen atom to which $R_4$ and $R_5$ are attached, forms a heterocyclic ring selected from the group consisting of the piperidine, morpholine, pyrrolidine, and piperazine rings, said crystals having a particle size between about 5 microns and about 20 microns, the ratio between breadth and length of salt crystals not exceeding a ration of 1:3.

References Cited by the Examiner
UNITED STATES PATENTS 2,776,279   1/1957   Muckter et al. _____ 260—239.1

ALEX MAZEL, *Primary Examiner.*

HENRY R. JILES, *Examiner.*

JAMES W. ADAMS, JR., *Assistant Examiner.*

UNITED STATES PATENT OFFICE
CERTIFICATE OF CORRECTION

Patent No. 3,288,785 November 29, 1966

Herbert Kuntscher et al.

It is hereby certified that error appears in the above numbered patent requiring correction and that the said Letters Patent should read as corrected below.

Column 1, line 54, for "at" read -- as --; column 4, line 36, for "decreased" read -- decrease --; line 54, strike out "a"; column 6, line 19, for "atained" read -- attained --; line 34, for "extrated" read -- extracted --; line 75, for "tantanol" read -- tanol --; column 8, line 15, for "50µ" read -- 50µ. --; column 11, line 44, after "2-pyr-" insert -- rolidyl-N-methyl benzimidazole hydrochloride. --; line 45, strike out "molecular amount of 1-p-chlorobenzyl-2-pyrrolidyl-N-"; line 50, for "-n-" read -- -N- --; column 12, line 46, for "ration" read -- ratio --.

Signed and sealed this 12th day of September 1967.

(SEAL)
Attest:

ERNEST W. SWIDER
Attesting Officer

EDWARD J. BRENNER
Commissioner of Patents